(12) United States Patent
Götz et al.

(10) Patent No.: US 7,705,109 B2
(45) Date of Patent: Apr. 27, 2010

(54) BLOCK COPOLYETHERESTER ELASTOMER AND PREPARATION THEREOF

(75) Inventors: Heide-Anna Götz, Ottobrunn (DE); Angelika Schmidt, Geleen (NL); Mohamed Redoine Dahrouch, Concepción (CL); Dionisius Maria Joseph Guillaume Gilissen, Eijsden (NL)

(73) Assignee: DSM IP Assets B.V., Heerlen (NL)

( * ) Notice: Subject to any disclaimer, the term of this patent is extended or adjusted under 35 U.S.C. 154(b) by 191 days.

(21) Appl. No.: 10/587,947

(22) PCT Filed: Feb. 3, 2005

(86) PCT No.: PCT/NL2005/000077

§ 371 (c)(1),
(2), (4) Date: Oct. 19, 2006

(87) PCT Pub. No.: WO2005/075537

PCT Pub. Date: Aug. 18, 2005

(65) Prior Publication Data

US 2008/0207839 A1    Aug. 28, 2008

(30) Foreign Application Priority Data

Feb. 5, 2004   (EP) ................... 04075383

(51) Int. Cl.
*C08G 63/66* (2006.01)
(52) U.S. Cl. ................. 528/300; 528/271; 528/272; 528/308.1; 528/308.3

(58) Field of Classification Search ............... 525/408; 528/272, 297, 300, 301, 271, 308.1, 308.3; 524/198, 255, 257
See application file for complete search history.

(56) References Cited

U.S. PATENT DOCUMENTS

| 4,500,575 A | 2/1985 | Taira et al. |
| 4,533,614 A | 8/1985 | Fukumoto et al. |
| 4,562,232 A | 12/1985 | Smith |
| 4,611,021 A | 9/1986 | Zamek |
| 4,672,141 A | 6/1987 | Motoi et al. |
| 4,687,835 A | 8/1987 | Zeilstra et al. |
| 4,910,290 A | 3/1990 | Tung et al. |
| 5,122,303 A | 6/1992 | Tieke |
| 6,380,290 B1 * | 4/2002 | Bonte et al. ............. 524/198 |

OTHER PUBLICATIONS

International Search Report.

* cited by examiner

*Primary Examiner*—Ling-Siu Choi
*Assistant Examiner*—Frances Tischler
(74) *Attorney, Agent, or Firm*—Nixon & Vanderhye P.C.

(57) ABSTRACT

Processes for the preparation of a block copolyetherester elastomer and block copolyether elastomers made thereby are provided having polyester hard blocks and poly(alkylene oxide) polyol soft blocks, wherein at least one aromatic dicarboxylic acid or an ester-forming derivative thereof, and at least one alkylene diol, are esterified with a poly(alkylene oxide) polyol, comprising an poly(propylene oxide), end capped with ethylene oxide, are esterified, an ethylene oxide content of between 22 and 90% by weight, relative to the total weight of the poly(alkylene oxide) polyol, and an unsaturation content, being the total content of vinyl and allyl groups, of less than 35 meq per kg poly(alkylene oxide) polyol.

22 Claims, 1 Drawing Sheet

BLOCK COPOLYETHERESTER ELASTOMER AND PREPARATION THEREOF

This application is the US national phase of international application PCT/NL2005/000077 filed 3 Feb. 2005 which designated the U.S. and claims benefit of EP 04075383.2, dated 5 Feb. 2004, the entire content of which is hereby incorporated by reference.

The invention relates to a process for the preparation of a block copolyetherester elastomer comprising polyester hard blocks and poly(alkylene oxide) blocks wherein at least one aromatic dicarboxylic acid or an ester-forming derivative thereof, at least one alkylene diol, and a poly(alkylene oxide) polyol, comprising an poly(propylene oxide) end capped with ethylene oxide, are esterified. The invention further relates to a block copolyetherester elastomer comprising polyester hard blocks and poly(alkylene oxide) blocks, obtainable by esterification of at least one aromatic dicarboxylic acid or an ester-forming derivative thereof, at least one alkylene diol, and a poly(alkylene oxide) polyol, comprising a poly(propylene oxide) end capped with ethylene oxide.

Such a process is known from U.S. Pat. No. 4,687,835, and its family member EP-B-203634, and U.S. Pat. No. 4,205,158. Both U.S. Pat. No. 4,687,835 and U.S. Pat. No. 4,205,158 describe a copolyetherester consisting of hard blocks of short chain ester units and soft blocks of poly(propylene oxide) glycol end capped with 15 to 35 wt. % ethylene oxide and which has a (number average) molecular weight of 1500-2800. The short chain ester units comprise at least 75 mole percent of 1,4-butylene terephthalate units and form 25 to 55% by weight of the copolyetherester in U.S. Pat. No. 4,687,835, respectively 25-48% by weight of the copolyetherester in U.S. Pat. No. 4,205,158.

According to U.S. Pat. No. 4,205,158 the preparation of the above type of copolyetherester should be carried out in the presence of at least 1.5 equivalents, preferably 2.5-5.5 equivalents, of branching agent per 100 moles of dicarboxylic acid in order to obtain a sufficient high degree of polymerization without excessive polymer degradation during the melt condensation polymerization. U.S. Pat. No. 4,205,158 further says that if no use is made of a branching agent in the preparation of a copolyetherester of the composition given in it, the physical properties such as tensile strength and tear resistance achievable for the copolyetherester appear to be quite insufficient as compared with those of similar hardness and based on polytetramethylene oxide glycol.

The process of U.S. Pat. No. 4,205,158 therefore has the disadvantage that it is not suited for compositions with no or less than 1.5 equivalents of a branching agent per 100 moles of dicarboxylic acid. Branching of the polymers might be advantageous for certain applications, such as films, whereas for others however, such as fibres, it might be advantageous to have very little branching or no branching at all. In U.S. Pat. No. 4,687,835 it is said that although according to the examples of U.S. Pat. No. 4,205,158 said physical properties can be improved by including in the copolyetheresters a relative large amount of branching agent, it appears that when use is made of a large amount of branching agent several of the physical properties, such as elongation at rupture, (notched) tensile impact energy and tearing energy, still need to be further improved.

According to U.S. Pat. No. 4,687,835, this is achieved with the copolyetheresters described above, and containing no or less than 1.5 equivalents of a branching agent per 100 moles of dicarboxylic acid, and having a melt index between specific limits. These copolyetheresters are prepared in U.S. Pat. No. 4,687,835 with a 2-step process wherein first a copolyetherester of a relative viscosity of 1.8 to 2.5 is prepared by melt condensation, followed by post condensation in the solid phase in a stream of inert gas or in vacuum at a temperature of 170° C. to 220° C. until a relative viscosity of 2.45 to 5.0 is obtained. According to U.S. Pat. No. 4,687,835, these copolyetheresters display a higher elongation at rupture, notched tensile impact energy and tearing energy than copolyetheresters of similar composition and hardness that are prepared by the process of U.S. Pat. No. 4,205,158.

The process of U.S. Pat. No. 4,687,835 has the disadvantages that it is complicated by the fact that it has two steps in which the viscosity has to be carefully controlled and that solid phase post condensation is a time consuming step. A further disadvantage is that the said process, according to U.S. Pat. No. 4,687,835, is not suited for poly(propylene oxide)glycol end capped with ethylene oxide with a number average molecular weight higher than 2800, since this might give rise to phase separation. As is known from experience by the inventors, phase separation during the preparation of copolyetheresters generally results in polymers with very bad mechanical properties.

The aim of the invention is therefore to provide a process for the preparation of a copolyetherester with soft blocks of poly(propylene oxide)glycol end capped with ethylene oxide, which does not have the disadvantages of the processes of U.S. Pat. No. 4,687,835 and U.S. Pat. No. 4,205,158, i.e. the aim is a process which is more flexible in the choice of the use, if any, of a branching agent and the amount thereof than the process of U.S. Pat. No. 4,205,158, and which process does not need the post condensation step of U.S. Pat. No. 4,205,158. A further objective is to provide a process that allows the use of poly(propylene oxide)glycol end capped with ethylene oxide with a number average molecular weight higher than 2800 while still resulting in copolyetherester with good mechanical properties.

This aim has been achieved with the process according to the invention, wherein
 the poly(alkylene oxide) polyol has an ethylene oxide content of between 22 and 90% by weight, relative to the total weight of the poly(alkylene oxide) polyol, and
 the poly(alkylene oxide) polyol has an unsaturation content, being the total content of vinyl and allyl groups, of less than 35 meq per kg poly(alkylene oxide) polyol.

The advantage of the process according to the invention is that by using a poly(alkylene oxide) polyol having an unsaturation content, being the total content of vinyl and allyl groups, of less than 35 meq per kg poly(alkylene oxide) polyol, a block copolyetherester polymer can be obtained with high flexibility, low hardness and good mechanical properties without using a solid state post condensation step, even if less than 1.5 equivalents of a branching agent per 100 moles of dicarboxylic acid is used. Furthermore, with the inventive process it is possible to use a PO-EO polyol with a number average molecular weight (Mn) of more than 2800 and still obtain copolyetheresters with good mechanical properties. In specific embodiments the copolyetheresters obtained with the inventive process have even better mechanical properties than the copolyetheresters obtained with the known processes described in U.S. Pat. No. 4,687,835 and U.S. Pat. No. 4,205,158.

Block copolyetheresters polymers wherein copolyether polyol with very high molecular weights are used are mentioned in U.S. Pat. No. 4,562,232. According U.S. Pat. No. 4,562,232 the copolyether polyol that is used in the block copolyetheresters polymers may have a molecular weight from about 350 to about 12000, and the copolyether polyol may be, amongst several others, a block copolymer of ethylene oxide and propylene oxide. For preparing the polymers it is mentioned in general that further polycondensation of prepolymer can be accomplished in the solid phase. The only examples given relate to polytetramethylene glycols with a molecular weight of 1000 and 2000. U.S. Pat. No. 4,562,232 does not give any details on copolyetheresters polymers with block copolymer polyols of poly(propylene oxide) end capped with ethylene oxide and how to prepare these polymers. U.S. Pat. No. 4,562,232 does not mention or relate to the problem underlying the present invention. U.S. Pat. No. 4,562,232 neither mentions nor suggests the solution to that problem as according to the present invention.

The process according to the invention can be carried out using any known method. Examples and preparation of copolyetheresters are for example described in Handbook of Thermoplastics, ed. O. Olabishi, Chapter 17, Marcel Dekker Inc., New York 1997, ISBN 0-8247-9797-3, in Thermoplastic Elastomers, 2nd Ed, Chapter 8, Carl Hanser Veriag (1996), ISBN 1-56990-205-4, in Encyclopedia of Polymer Science and Engineering, Vol. 12, Wiley & Sons, New York (1988), ISBN 0-471-80944, p. 75-117, and the references cited therein.

Polyols comprising blocks of poly(propylene oxide) and blocks of poly(ethylene oxide) are also known as EO-PO block copolymers. With a poly(propylene oxide) end capped with ethylene is indicated a tri-block copolymer with a poly(propylene oxide) (PPO) as the central block, and two end blocks of poly(ethylene oxide) (PEO). Advantages of such a polyether as soft block include its hydroxyl functionality and good reactivity and compatibility in the synthesis of polyether esters. Poly(alkylene oxide) polyols, comprising a poly(propylene oxide) end capped with ethylene oxide, will be denoted herein also as PO-EO polyols.

The poly(alkylene oxide) polyol that can be used in the process according to the invention can be any PO-EO polyol having less than 35 meq unsaturation per kg poly(alkylene oxide) polyol and having an ethylene oxide content of between 22 and 90% by weight, relative to the total weight of the poly(alkylene oxide) polyol.

Preferably the poly(alkylene oxide) polyol that is used in the inventive process has an Mn of between 2500 and 5000 g/mol. More preferably, the Mn is between 2800 and 5000, still more preferably, the Mn is between 3000 and 5000. The advantage of a higher minimum Mn is that softer copolyetheresters with higher elongation can be obtained Also preferably, the poly(alkylene oxide) polyol has an ethylene oxide content (EO-content) between 25 and 80%, more preferably between 30 and 70% and still more preferably between 40 and 60% by weight, relative to the total weight of the poly(alkylene oxide) polyol. Use of a PO-EO polyol with a higher EO-content in the process according to the invention has the advantage that films resulting from the polymers have a higher water vapour transmission rate (MVTR) while the very good mechanical properties are retained. A lower maximum EO-content has the advantage that the films show less swelling.

It is furthermore preferable, that the poly(alkylene oxide) polyol has an unsaturation content, being the total content of vinyl and allyl groups, of less than 30 meq, more preferably less than 25 or even 20 meq, and still more preferably less than 15 meq, per kg poly(alkylene oxide) polyol. The advantage of the use of a PO-EO polyol with a lower unsaturation content is that the process becomes less critical with regard to the preparation of copolyether ester copolymers and that copolyether ester copolymers can be made with an even higher content of PO-EO polyol and or with PO-EO polyols with a higher molecular weight while still retaining copolyether ester copolymers with as good or even better mechanical properties, in particular higher elongation, and with better MVTR values.

PO-EO polyols that can be used in the process according to the invention can be prepared by conventional methods. Poly(propylene oxide) homopolymers and poly(propyleneoxide)-poly(ethylene oxide) block copolymers are generally prepared by base catalysis, such as by the use of potassium hydroxide or sodium hydroxide or their alcoholates. The polymers formed mainly contain hydroxyl, vinyl, allyl and propenyl end groups. The vinyl and allyl unsaturation is introduced by a side reaction during the polymerisation. The allyl end groups that are formed during the polymerisation can undergo a rearrangement to propenyl end groups in the basic polymerisation medium (Polyethers, ACS Symposium Series No. 6, E. J. Vandenberg, Publ. ACS Washington, 1975, ISBN 0-8412-0228-1, Chapter 2). The total amount of unsaturated end groups in the polyols can be lowered by subsequently hydrolysing the vinyl and propenyl end groups under acidic conditions (Advanced Organic Chemistry, J. March, $4^{th}$ Edition, /A. Wiley-Interscience Publication 1992 page 373). An other method of obtaining a poly(propylene oxide) homo or copolymer with a low number of unsaturated end groups is by using a different polymerisation catalyst as for example catalysts from the group of zinc hexacyanocobaltate complexes (Polyethers, ACS Symposium Series 6, E. J. Vandenberg, Publ. ACS Washington, 1975, ISBN 0-8412-0228-1, Chapter 2). Since the decrease of the amount of unsaturations is a time consuming process, this is generally not done. This explains why commercial polyols, and in particular high Mn polyols, generally have a high unsaturation content. For the present invention a low unsaturation content, i.e. less than 35 meq per kg polyol, next to a higher EO-content, i.e. between 22 and 90% by weight, is essential.

A preferred embodiment is constituted by the inventive process, wherein:
a) the poly(alkylene oxide) polyol has an ethylene oxide content of between 30 and 70% by weight;
b) the poly(alkylene oxide) polyol has an unsaturation content, being the total content of vinyl and allyl groups, of less than 25 meq per kg poly(alkylene oxide) polyol; and
c) the poly(alkylene oxide) polyol has an Mn of between 2500 and 5000 g/mol;

Another preferred embodiment is constituted by the inventive process, wherein a block copolyetherester elastomer is formed, wherein
d) the ratio by weight of poly(alkylene oxide) polyol/aromatic dicarboxylic acid or an ester-forming derivative thereof is between 60/40 and 90/10;
e) the average degree of polymerization of the polyester block is at least 3.5; and
f) the block copolyetherester elastomer has an Mn of at least 25,000 g/mol.

In the process according to the invention a compound may be used having two or more functional groups that can react with an acid- or hydroxyl-group, acting as chain extension or chain branching agent, respectively. A chain extension agent is herein understood a component having a functionality of 2. Examples of suitable chain extension agents include carbonylbislactams, diisocyanates and bisepoxides. A branching agent is herein understood a component having a functionality of 3 of higher and wherein the functionality consists of a function group capable of reacting with a hydroxyl group and/or with a carboxylic acid group. Suitable branching agents are, for example, trifunctional alcohols or triols, such as trimethylol propane, and trifunctional carboxylic acids, which include e.g. trimellitic acid, trimellitic acid anhydride and. The amount and type of chain extension or branching agent is chosen such that a block copolyetherester of desirable melt viscosity is obtained. In general, the amount of a chain branching agent will not be higher than 6.0 equivalents per 100 moles of dicarboxylic acids present in the copolyetherester.

In a preferred embodiment of the process according to the invention the esterification reaction is performed in the presence of up to 6.0 equivalents, per 100 moles of dicarboxylic acid, of a diisocyanate. It is noted that, where herein the equivalents are expressed per 100 moles of dicarboxylic acid, the dicarboxylic acid also includes ester derivatives thereof.

More preferably, if diisocyanates are applied, said reaction is preferably performed in the polymer melt, for example in an extruder, as the used diisocyanate may be too reactive to immediately add to the reactor.

As is indicated before the process according to the invention can be carried out without the use of a branching agent, and without the application of a solid-state post condensation step. In addition to that, the process according to the invention has the flexibility to be also applied involving the use of a branching agent, with a free choice for the amount, for example a low amount, of for example 0.5-1.0 equivalents, or of a higher amount of for example 1.5-6.0 equivalents, depending upon the needs following from the intended application of the copolyetherester elastomer. An amount of 0-1.0 equivalents is preferred for fibre grades, whereas an amount of 2.5-5 is preferred for, for example, film grades. The equivalents here mentioned are all expressed per 100 moles of dicarboxylic acid as used in the process according to the invention.

Further preferred embodiments of the inventive process relate to the block copolyetherester elastomers, obtainable with the inventive process, and preferred embodiments thereof as described here below.

The invention also relates to a block copolyetherester elastomer comprising polyester hard blocks and poly(alkylene oxide) blocks, obtainable by esterification of at least one aromatic dicarboxylic acid or an ester-forming derivative thereof, at least one alkylene diol, and a poly(alkylene oxide) polyol, comprising a poly(propylene oxide) end capped with ethylene oxide.

As has been said above such a block copolyetherester elastomer is known from U.S. Pat. No. 4,687,835, and its family member EP-B-203634. The known elastomer is made of dimethyl terephthalate (DMT), 1,4-butane diol and poly-1,2-propylene oxide glycol capped with ethylene oxide (EO/PO block polyether). The EO/PO block polyether in the known elastomer has a number average molecular weight of 2370 g/mol and an ethylene oxide content of 20% by weight. For the known elastomer the following properties have been reported: hardness Shore D 37 and Elongation at rupture ($E_B$): 970%, flexural modulus 46 MPa and tensile strength 23 MPa.

A disadvantage of the known elastomer is that its modulus and hardness are too high for applications such as highly elastic fibers and films. If polymers with a lower softness are made the elongation drops significantly, while the flexural modulus remains high: hardness Shore D 33.5, Eb 709%, and flexural modulus 47 MPa.

A block copolyetherester elastomer as described above is also known from the other patent mentioned above, i.e. from U.S. Pat. No. 4,205,158. The known elastomers of U.S. Pat. No. 4,205,158 have been made of dimethyl terephthalate (DMT), 1,4-butane diol, poly-1,2-propylene oxide glycol capped with ethylene oxide, and trimellitic anhydride as branching agent. The EO/PO block polyethers in these known elastomers have (#1) a number average molecular weight (Mn) of 2200 g/mol and an ethylene oxide content (EO content) of 26.3% by weight, respectively (#2) Mn 2400 and EO content 17.9% by weight. For the known elastomers the following properties have been reported: (#1) tensile strength 15 MPa, hardness Shore A 85 and $E_B$: 1030%, respectively (#2): $E_B$: 1050% and Ts 14.7 MPa.

A disadvantage of the known elastomer of U.S. Pat. No. 4,205,158 is that, though the elongation is slightly higher, the tensile strength is much lower than that of U.S. Pat. No. 4,687,835.

A further disadvantage of the known elastomers of U.S. Pat. No. 4,687,835 and U.S. Pat. No. 4,205,158 is that the plastic strain after high deformation is too high for applications such as highly elastic fibers and films and the water vapour permeability is too low for application in barrier coatings.

A general approach for reducing the modulus and hardness of block copolymers in general is by increasing the number of "soft blocks". For block copolyetherester elastomers this would mean that the number of poly(alkylene oxide) blocks, which act as soft blocks in said elastomers, would have to be increased to reduce the modulus and hardness. However, if this approach is applied for modifying the known elastomer, the mechanical properties, in particular the elongation-at-break, deteriorate.

The aim of the invention is to provide an block copolyetherester elastomer having improved mechanical properties compared to the known elastomer of U.S. Pat. No. 4,205,158, in particular reduced modulus and hardness, while retaining a sufficiently high elongation and tensile strength at break and/or improved elongation and/or improved water vapour permeability compared to the known compositions of both U.S. Pat. No. 4,687,835 and U.S. Pat. No. 4,205,158.

This aim has been achieved with the block copolyetherester elastomer obtainable by the process according to the invention, wherein
  a) the poly(alkylene oxide) polyol has an poly(ethylene oxide) content of between 22 and 90% by weight;
  b) the block copolyetherester elastomer has an unsaturation content, being the total content of vinyl and allyl groups, of less than 35 meq per kg of the poly(alkylene oxide) polyol;
  c) the poly(alkylene oxide) polyol has a Mn of between 2500 and 5000 g/mol;
  d) the ratio by weight of poly(alkylene oxide) polyol/aromatic dicarboxylic acid or an ester-forming derivative thereof is between 50/50 and 90/10;
  e) the average degree of polymerization of the hard polyester block is at least 3.5;
  f) the block copolyetherester elastomer has a Mn of at least 25,000 g/mol.

The block copolyetherester elastomer according to the invention surprisingly features a significantly reduced modulus and Shore A hardness, while the elongation at break is retained at the same level or even improved compared to the known elastomer. Surprisingly, these good mechanical properties are obtained even if no branching agent is used. Another surprising advantage of the block copolyetherester copolymer according to the invention is that it shows a high moisture vapour transmission rate (MVTR).

The block copolyetherester elastomer according to the invention comprises polyester blocks as "hard blocks" and polyalkylene oxide blocks as "soft blocks".

The hard polyester blocks are built up from repeating units derived from at least one alkylene diol and at least one aromatic dicarboxylic acid or an ester-forming derivative thereof. The alkylene diol contains generally 2-6 C-atoms, preferably 2-4 C-atoms. Examples thereof include ethylene glycol, propylene diol and butylene diol. Preferably, 1,4-butylene diol is used. Examples of suitable aromatic dicarboxylic acids include terephthalic acid, 2,6-naphthalenedicarboxylic acid, 4,4'-biphenyldicarboxylic acid or combinations of these. The hard segments may optionally further contain a minor amount of units derived from other dicarboxylic acids, for example isophthalic acid. The amount of other dicarboxylic acids is preferably limited to not more than 10 mol %, more preferably not more than 5 mol %, so as to ensure that, among other things, the crystallization behaviour of the copolyetherester is not adversely affected. The hard segment is preferably built up from ethylene terephthalate, propylene terephthalate, and in particular from butylene terephthalate as repeating units. Advantages of these readily available units include favourable crystallisation behaviour and a high melting point, resulting in copolyetheresters with good processing properties and excellent thermal and chemical resistance. In other preferred embodiments of the copolyetheresters according to the invention, the hard segments in the copolyetherester are built up from units derived from ethylene glycol, 4,4'-biphenyldicarboxylic acid, terephthalic acid and/or 2,6-naphthalenedicarboxylic acid, and optionally minor amounts of other diacids and/or diols. These copolyetheresters show a high crystalline melting point, and fast crystallisation upon cooling from the melt.

The soft poly(alkylene oxide) blocks comprise poly(propylene oxide) end capped with ethylene oxide. Preferably the poly(alkylene oxide) polyol is a diol. Herein diol is understood to mean that the poly(alkylene oxide) polyol has essentially two hydroxyl groups as end groups; i.e. is it has a hydroxyl functionality of about 1.7-2.3. A lower functionality would hamper synthesis of a block copolyetherester elastomer of sufficiently high molar mass; a higher functionality would undesirably increase chain branching or even induce cross-linking of the block copolyetherester elastomer. The hydroxyl functionality is therefore preferably 1.8-2.2, more preferably 1.9-2.1, and even more preferably about 2.

The poly(alkylene oxide) polyol used in the block copolyetherester elastomer according to the invention has an Mn of between 2500 and 5000 g/mol, preferably between 2800 and 5000 g/mol, more preferably between 3000 and 5000 g/mol. The use of a higher Mn poly(alkylene oxide) polyol instead of conventional lower Mn poly(alkylene oxide) polyols results in poly(alkylene oxide) blocks with a relatively high Mn and consequently a relatively high length. By using such "long" poly(alkylene oxide) blocks it is possible to increase the content of soft blocks in the block copolyetherester elastomer and thereby soften the block copolyetherester copolymer, while still obtaining a polyetherester showing a sufficient crystallization behaviour and sufficient tear resistance and tensile strength. It is important that polyester crystallization occurs in the block copolyetherester elastomer according to the invention. Easily destroyable small irregular polyester crystallites may furthermore contribute to irreversible deformation, having a negative effect on the recoverability of the block copolyetherester elastomer. Furthermore, insufficient crystallization of the polyester hard block may result in an undesirably low melting point/crystallization temperature of the block copolyetherester elastomer. For some applications, for example fiber spinning, a high crystallization temperature is crucial. Optionally the crystallization temperature of the block copolyetherester elastomer may be increased by the addition a nucleating agent.

The poly(alkylene oxide) polyol has a poly(ethylene oxide) content of between 22 and 90% by weight, preferably between 30 and 70% by weight, more preferably between 40 and 60% by weight, and most preferably between 45 and 55% by weight. Preferably the amount of poly(ethylene oxide) in the poly(alkylene oxide) polyol and the Mn of the poly(alkylene oxide) polyol is chosen such that during the esterification reaction no macrophase separation occurs, which would deteriorate the mechanical properties of the block copolyetherester elastomer. Macrophase separation occurs when the hard and soft segments are no longer compatible with one another under the conditions of melt condensation. This leads to a two-phase morphology of the copolyetherester on a relatively large scale (micrometer), with one phase rich in soft segments and the other rich in hard segments. Macrophase separation is defined in for example "Thermoplastic elastomers", N. R. Legge, G. Holden, H. E. Schroeder, Carl Hanser Verlag, Munich, 1987. It is generally known that a higher poly(ethylene oxide) content results in a better mixing of polyester and the poly(alkylene oxide) polyol, which reduces the tendency for macrophase separation. On the other hand, a too high poly(ethylene oxide) content may lead to poly(ethylene oxide) crystallization, which can limit the low temperature performance. Therefore, the poly(ethylene oxide) content is balanced to avoid macrophase separation and poly(ethylene oxide) crystallization as much as possible.

The ratio by weight of poly(alkylene oxide) polyol/aromatic dicarboxylic acid or an ester-forming derivative thereof is between 50/50 and 90/10, preferably between 60/40 and 90/10. The preferred amount depends on the Mn of the poly(alkylene oxide) polyol, i.e. the higher the Mn of the poly(alkylene oxide) polyol the more poly(alkylene oxide) polyol can be incorporated in the block copolyetherester elastomer without destroying too much of the polyester crystallinity. In order to obtain a block copolyetherester elastomer with a high elasticity and softness, it is preferable to apply the highest possible ratio of poly(alkylene oxide) polyol/aromatic dicarboxylic acid or an ester-forming derivative thereof, which still gives sufficient polyester crystallization.

Figure 1:
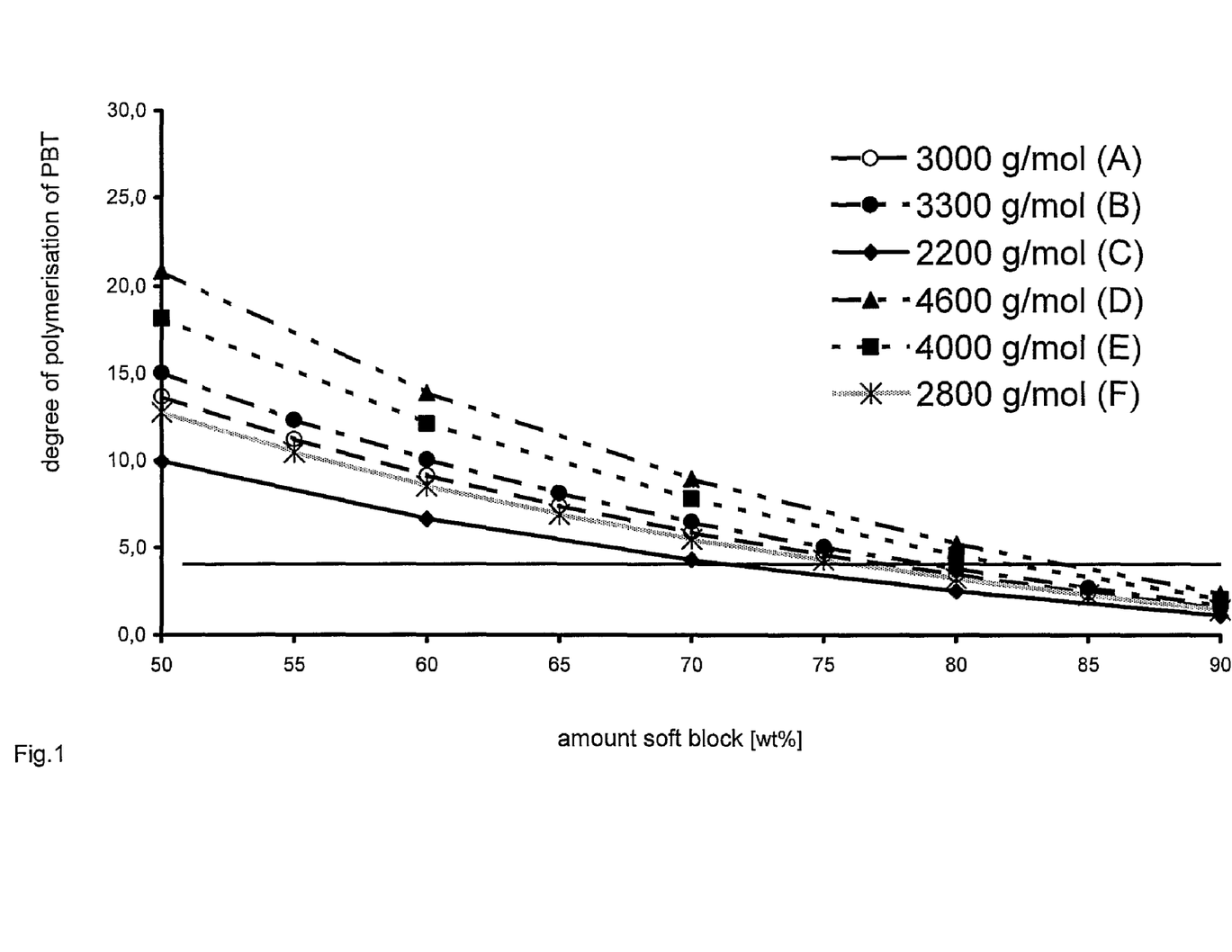
FIG. 1 shows a plot of the average number of butylene terephthalate units per PBT block as a function of the amount of poly(alkylene oxide) polyol in the block copolyetherester elastomer.

If the polyester is polybutylene terephtalate (PBT), the amount of poly(alkylene oxide) polyol which can be incorporated into a block copolyetherester elastomer while retaining sufficient PBT crystallization can be calculated from the overall length of the poly(alkylene oxide) polyol. FIG. 1 shows a plot of the average number of butylene terephthalate units per PBT block as a function of the amount of poly(alkylene oxide) polyol in the block copolyetherester elastomer. Herein it is assumed that the length of a PBT block in average should contain at least four butylene terephthalate units to still obtain PBT crystallinity (H. Schroeder and R. J. Chella, Elastic Polymers, Encycl. Polym. Sci. Eng., 12 (1986), p. 75). FIG. 1 shows for example that the maximum amount of poly(alkylene oxide) polyol which is possible to incorporate into the block copolyetherester copolymer is about 84% for a poly(alkylene oxide) polyol with Mn=4600 g/mol, about 82% for a poly(alkylene oxide) polyol with Mn=4000 g/mol, about 79% for a poly(alkylene oxide) polyol with Mn=3300, about 77% for a poly(alkylene oxide) polyol with Mn=3000 or 2800 and about 71% for a poly(alkylene oxide) polyol with Mn=2200. Therefore, the ratio by weight of poly(alkylene oxide) polyol/PBT is preferably equal to or smaller than 90/10 when 4000<Mn(poly(alkylene oxide) polyol)<5000 g/mol, preferably equal to or smaller than 82/18 when 3300<Mn(poly(alkylene oxide) polyol)<4000 g/mol, preferably equal to or smaller than 79/21 when 3000<Mn(poly(alkylene oxide) polyol)<3300 g/mol, and preferably equal to or smaller than 77/23 when 2500<Mn (poly(alkylene oxide) polyol)<3000 g/mol.

The average degree of polymerization of the polyester block is at least 3.5. The average degree of polymerization of PBT is the average number of butylene terephtalate monomer units in the PBT blocks of the block copolymer. If the average degree of polymerization is lower than 3.5 the block copolyetherester elastomer material may not crystallize to a sufficient amount and show bad mechanical properties.

The block copolyetherester elastomer that is used for the preparation of the copolyetheresters preferably has a unsaturation content of less than 25 meq per kg of the poly(alkylene oxide) polyol, preferably less than 20 meq per kg of the poly(alkylene oxide) polyol and more preferably less than 15 meq per kg of the poly(alkylene oxide) polyol. Conventional poly(alkylene oxide) polyols with a high amount of unsaturated end groups (vinyl and allyl) usually result in a low molecular weight of the block copolyetherester elastomer as the unsaturated end groups act as chain stoppers in the polycondensation reaction. Such low molecular weight block copolyetherester elastomers usually feature a low strain at break. The poly(alkylene oxide) polyol used for the preparation of the block copolyetherester according to the invention has a low unsaturation content and has a high reactivity, resulting in a high molecular weight of the block copolyetherester elastomer after a relatively short copolymerization time. It has thus been found that the block copolyetherester elastomer according to the invention, obtainable by using a poly(alkylene oxide) polyol with a high Mn and a low amount of unsaturated end groups, has a sufficiently high molecular weight and improved elasticity, softness and mechanical properties.

The Mn of the block copolyetherester elastomer can calculated from the end groups, i.e. unsaturations, COOH and OH groups, and is expressed in meq/kg of the block copolyetherester elastomer. For the molecular weight following formula holds:

$$M_n[g/mol] = \frac{10^6}{\sum EG[meq/kg]/2}$$

wherein EG=endgroups (COOH, OH, unstaturation).

The block copolyetherester elastomer has an Mn of at least 25,000 g/mol, preferably at least 30,000 g/mol, more preferably at least 35,000 g/mol. As explained above, the Mn of the block copolyetherester elastomer is among other dependent on the unsaturation content of the poly(alkylene oxide) polyol used for the soft block. A higher Mn usually results in improved mechanical properties, as can be seen from the examples.

In a preferred embodiment of the invention the block copolyetherester elastomer consists of repeating units of hard blocks consisting of short chain ester units derived from at least one aromatic dicarboxylic acid or an ester-forming derivative thereof and at least one alkylene diol, and soft blocks derived from a poly(propylene oxide) polyol end capped with ethylene oxide, wherein:
a) the poly(alkylene oxide) polyol has a Mn of between 2800 and 5000 g/mol;
b) the poly(alkylene oxide) polyol has an ethylene oxide content of between 22 and 90% by weight;
c) the ratio by weight of poly(alkylene oxide) polyol/aromatic dicarboxylic acid or the ester-forming derivative thereof is between 60/40 and 90/10;
d) the average degree of polymerization of the polyester block is at least 3.5;
e) the block copolyetherester elastomer has an Mn of at least 25,000 g/mol.

In another preferred embodiment of the invention the block copolyetherester elastomer consists of repeating units of hard blocks consisting of short chain ester units derived from at least one aromatic dicarboxylic acid or an ester-forming derivative thereof and at least one alkylene diol, and soft blocks derived from a poly(propylene oxide) polyol end capped with ethylene oxide, wherein:
a) the poly(alkylene oxide) polyol has a Mn of between 2500 and 5000 g/mol;
b) the poly(alkylene oxide) polyol has an ethylene oxide content of between 35 and 90% by weight;
c) the ratio by weight of poly(alkylene oxide) polyol/aromatic dicarboxylic acid or the ester-forming derivative thereof is between 60/40 and 90/10;
d) the average degree of polymerization of the polyester block is at least 3.5;
e) the block copolyetherester elastomer has an Mn of at least 25,000 g/mol.

In a more preferred embodiment of the invention the block copolyetherester elastomer consists of repeating units of hard blocks consisting of short chain ester units derived from at least one aromatic dicarboxylic acid or an ester-forming derivative thereof and at least one alkylene diol, and soft blocks derived from a poly(propylene oxide) polyol end capped with ethylene oxide, wherein:
a) the poly(alkylene oxide) polyol has a Mn of between 2800 and 5000 g/mol;
b) the poly(alkylene oxide) polyol has an ethylene oxide content of between 35 and 90% by weight;
c) the ratio by weight of poly(alkylene oxide) polyol/aromatic dicarboxylic acid or the ester-forming derivative thereof is between 60/40 and 90/10;
d) the average degree of polymerization of the polyester block is at least 3.5;
e) the block copolyetherester elastomer has an Mn of at least 25,000 g/mol.

Preferably the block copolyetherester elastomer according to the invention has a high moisture vapour transmission rate (MVTR), in order to be suitable for use in for example breathable films. The MVTR can be measured according to ASTM E96B (wet cup, 38° C., 50% relative humidity), resulting in the MVTR (E96B), and according to ASTM E96BW (inverted cup, 38° C., 50% relative humidity), resulting in MVTR (E96BW). The MVTR (E96B) and the MVTR (E96BW) increase with increasing amount of poly(alkylene oxide) in the block copolyetherester elastomer and with increasing amount of poly(ethylene oxide) in the poly(alkylene oxide). Preferably, the MVTR (E96B) is equal to or higher than 100 g·mm/m²·day, more preferably equal to or higher than 112 g·mm/m²·day, most preferably equal to or higher than 130 g·mm/m²·day. Preferably, the MVTR (E96BW) is equal to or higher than 550 g·mm/m²·day, more preferably equal to or higher than 900 g·mm/m²·day, most preferably equal to or higher than 1300 g·mm/m²·day.

The ShoreA hardness of the block copolyetherester elastomer according to the invention, measured according to DIN 53505, is dependent on the amount of polyalkylene oxide, the soft block, in the elastomer. For applications in which a high softness is required, for example elastic films of elastic fibers, a low ShoreA hardness of the block copolyetherester elastomer is desirable. Preferably the ShoreA hardness of the block copolyetherester according to the invention is equal to or lower than 92, more preferably equal to or lower than 87, in particular equal to or lower than 84, more in particular equal to or lower than 80.

The E'(23° C.) (tensile modulus determined by DMTA) of the block copolyetherester elastomer according to the invention, measured according to ASTM D5026, is also dependent on the amount of polyalkylene oxide, the soft block, in the elastomer. Preferably the E'(23° C.) is equal to or lower than 50 MPa, more preferably equal to or lower than 30 MPa, in particular equal to or lower than lower than 20 MPa, more in particular equal to or lower than 10 MPa.

The block copolyetherester elastomer according to the invention can be used in for example an elastic fiber or in an elastic film. Preferably the elastic film is breathable.

The invention also relates to a composition comprising the block copoletherester copolymer according to the invention and at least one other additive.

The copolyetherester composition may further comprise any customary additives, like heat- and UV-stabilisers, anti-oxidants, colorants, processing aids like mould release agents or melt-flow enhancers, or mineral fillers. Preferably, the composition contains an effective amount of a heat-stabilisation and anti-oxidant package in view of the relatively long residence times in the melt, that are encountered during making of a preform. Generally, the total amount of such additives is less than 10 mass %, preferably about 0.05-5 or 0.1-3 mass % based on the total composition is applied.

In a preferred embodiment, the composition comprises a nucleating agent. The advantage is that the crystallization temperature of the block copoletherester copolymer is increased. This is in particular advantageous for the block copoletherester copolymer with a high content of PO-EO polyol soft blocks and/or with PO-EO polyol soft blocks with a high Mn.

Nucleating agents are sometimes also referred to as crystallisation improvers or crystallisation promoters. In general, suitable nucleating agents for the present copolyetherester composition include those already known in the art, especially for polyesters, like poly(ethylene terephthalate). Suitable agents include inert particulate nucleating agents, metal salts of monocarboxylic acids and dicarboxylic acids; metal salts of aromatic carboxylic acids such as benzoic acid; hydrous magnesium silicates such as talcum, and aluminium silicates such as clay; polyol acetals such as substituted sorbitol; metal salts of organophosphates such as sodium di(4-t-butylphenyl) phosphate, and others. Suitable examples of metal salts of a carboxylic acids, are potassium, lithium or sodium salts. Preferably, a sodium salt of a carboxylic is chosen as nucleating agent in view of handling and effectiveness. Examples of such acids, the metal salts of which may be used as nucleating agents, include formic, acetic, propionic, butyric, valeric, caproic, caprylic, capric, lauric, itaconic, myristic, palmitic, stearic, oleic, linoleic, linolenic, cyclohexanecarboxylic, phenylacetic, benzoic, o-toluic, m-toluic, p-toluic, o-chlorobenzoic, m-chlorobenzoic, p-chlorobenzoic, o-bromobenzoic, m-bromobenzoic, p-bromobenzoic, o-nitrobenzoic, m-nitrobenzoic, p-nitrobenzoic, phthalic, isophthalic, terephthalic, salicylic, p-hydroxybenzoic, anthranilic, m-aminobenzoic, p-aminobenzoic, o-methoxybenzoic, m-methoxybenzoic, p-methoxybenzoic (anisic), oxalic, malonic, succinic, glutaric, adipic, maleic and fumaric acid. Preferred metal salts of carboxylic acids include sodium stearate and sodium benzoate. Also, fine mineral particles such as hydrous magnesium silicates (talcum) and hydrous aluminum silicates (clay) function as inert particulate nucleating agents suitable for use in the practice of the present invention. Preferably, talcum of average particle size below 150 micrometer ($\mu m$), below 100 $\mu m$ or even below 50 $\mu m$ is chosen as nucleating agent.

In a preferred embodiment of the invention, talcum particles of particle size 0.01-40 $\mu m$ are used, more preferably of particle size 0.01-25 $\mu m$, which particles have been melt-dispersed into a carrier material, preferably a copolyetherester, optionally in a concentration higher than the desired concentration in the block copolyetherester elastomer. Such a concentrate of nucleating agent can be easily blended with the block copolyetherester elastomer and optionally other additives. The advantage of this concentrate route is a better control over dispersion of nucleating agent particles and homogeneous distribution thereof in the composition, which results in further improving the consistency and reproducibility of the process according to the invention.

Preferably, the block copolyetherester elastomer composition according to the invention comprises 0.02-1 mass % of nucleating agent, more preferably 0.05-0.5 or 0.07-0.25 mass %, relative to the mass of the block copolyetherester elastomer.

The invention further relates to the use of the block copolyetherester elastomer according to the invention or composition comprising the inventive block copolyetherester elastomer in an elastic fiber or an elastic, preferably breathable, film. The invention also relates to a product comprising at least one block copolyetherester elastomer according to the invention, in particular to an elastic fiber and an elastic film.

The invention is further illustrated with the following examples and comparative experiments.

Starting Materials

Dimethylterephthalate (DMT) from BP Amoco, butanediol (BD) from BASF, Pluronic PE 6201, Pluronoc PE9200 and Pluronic PE9400 from BASF, Acclaim 4220 from Bayer and TB4040, tetrabutyl titanate (TBT) from Fluka and magnesium acetate tetrahydrate ($Mg(OAc)_2.4H_2O$) from Aldrich were used as received.

PO-EO polyols A-C, complying with the requirements of the inventive process, where prepared in two steps. First a polyol with the required EO content and Mn was prepared with the use of potassium hydroxide as the catalyst. Subsequently, the polyols thus formed were hydrolysed under acidic conditions.

Information about the chemical compositions of the poly(alkylene oxide) polyols used in the Examples and Comparative Experiments is given in Table 1.

TABLE 1

Molecular weights, compositions and amount of unsaturations of the investigated poly(alkylene oxide) polyols.

| Poly(alkylene oxide) polyol | Mn (PEO) [g/mol] | Mn (PPO) [g/mol] | Mn (PEO) [g/mol] | Mn [g/mol] (overall) | % PEO/ % PPO | Unsaturations [meq/kg] |
|---|---|---|---|---|---|---|
| Polyol A | 680 | 1650 | 680 | 3000 | 45/55 | 10 |
| Polyol B | 830 | 1650 | 830 | 3300 | 50/50 | 9 |
| Polyol C | 580 | 1650 | 580 | 2800 | 40/60 | 27 |
| Pluronic PE6201 (D) | 275 | 1750 | 275 | 2300 | 30/70 | 36 |
| Pluronic PE9400 (E) | 925 | 2750 | 925 | 4600 | 40/60 | 57 |
| Acclaim 4220 (F) | 400 | 3200 | 400 | 4000 | 20/80 | 10 |
| Pluronic PE9200 (G) | 688 | 2750 | 688 | 3400 | 20/80 | 104 |

General Procedure for the Preparation of Block Copolyetherester Elastomer

DMT (150.8 g, 0.777 mol), BD (97.9 g, 1.09 mol), poly(alkylene oxide) polyol (0.139 mol), catalyst TBT (384 mg, 1.128 mmol) and cocatalyst Mg(OAc)$_2$.4H$_2$O (241 mg, 1.128 mmol) and Irganox 1330 (0.5 weight %) were placed in a lab scale glass autoclave under nitrogen. The reaction mixture was heated slowly under stirring and a slight nitrogen flow from room temperature to 220° C. The transesterification reaction started around 160° C. The formed methanol was distilled off. Subsequently, the melt temperature was increased until 245° C. and excess BD distilled under vacuum (<1 mbar). The polycondensation reaction was stopped after reaching the desired melt viscosity. The torque, being proportional to the melt viscosity, was measured by monitoring the electrical current required to maintain an agitation rate of 20 rpm. At the end of the reaction, the melt was released from the reactor under nitrogen pressure into a water bath and rolled up to form a thread. Subsequently, the thread was chopped into pellets, ready for analysis and processing.

Viscometry

Viscometry was performed using a Ubbelohde capillary viscosimeter (Schott). The flow time was determined using 10 wt-% in m-cresol at 25° C. A correction according to Hagenbach was applied.

Carboxylic Acid End Groups Analysis

The content of carboxylic end groups was determined by titration with potassium hydroxide, the equilibrium being determined with a Methrohm photometer E662.

OH End Group Analysis

OH end groups were determined by dissolution of the block copolyetherester elastomer together with internal standard 1-hexadecanol in 1,1,1,3,3,3-hexafluoro-2-propanol. Subsequently the hydroxyl groups were esterified by anthracenoylchloride. The solution was analyzed by HPLC, using UV detection.

$^1$H NMR $^1$H NMR was used to determine the unsaturated vinyl and allyl end groups and the PEO content in the poly(alkylene oxide) polyol. Analyses were performed on a Bruker ARX-400, using DMSO-d$_6$ as the solvent.

DSC

DSC measurements were performed on a Mettler DSC 821. The samples were heated from room temperature to 250° C. and kept at this temperature for 5 min. Subsequently the samples were cooled to −120° C. with a holding time of 5 min and heated to 250° C. again. The rate of heating/cooling was 10° C./min.

DMTA

The materials were pressed into films of 70×40 mm and a thickness of 0.08 mm using a standard pressing procedure (T=240° C.). From these films test samples were cut. The DMTA measurements in tension were performed on the RSA-II from Rheometrics according to ASTM D5026 using a frequency of 1 Hz. The temperature was varied from −130 to 240° C. with 5° C./min.

Tensile Tests/Hysteresis Tests

Tensile and Hysteresis tests were performed on test bars (ISO 527-2), which were cut from 2 mm thick injection moulding plates (parallel to the injection moulding direction). A Zwick tensile machine was used, which was equipped with the appropriate rubber clamps, a load cell of 2000N and optical sensors to measure the strain. All tests were performed with a speed of 100 mm/min. For the hysteresis tests the strain was increased by 25% for each cycle and the dwell time (waiting time at the end of each cycle) was set to 0 s. All tests were at least performed in 3 fold.

Moisture Vapor Transmission Rate

Moisture vapor transmission rates were measured on compression moulded films (ca 80 to 100 µm), which have been prepared from granules using a standard pressing procedure (T=240° C.). The tests were performed according to ASTM E96B and E96BW at 38° C. and 50% relative humidity. Temperature and humidity were controlled by a climate chamber form CTS.

EXAMPLES I-VIII

Comparative Experiments 1-6

Synthesis of the Block Copolyetherester Elastomer

Using different amounts of the poly(alkylene oxide) polyols A-G a series of block copolyetherester elastomers has been synthesized as described above. The amount of poly(alkylene oxide) polyols was increased up to the theoretically calculated limit for PBT crystallization for each soft block (see description). For each reaction the polycondensation time, the appearance of the melt, the torque at the end of the polycondensation (pc), the relative viscosity $\eta_{rel}$, the results of the end group analysis and the molecular weight calculated form the end groups are given in Table 2.

Polyols A, B and C were used in Examples I-VIII; these polyols comply with the requirements of the process according to the invention. In Comparative Experiments 1-6 polyols D, E, F and G were used In Comparative Experiment 1 poly(alkylene oxide) polyol D is used, which has a Mn smaller than 2500 g/mol and an unsaturation content slightly higher than 35 meq per kg of the poly(alkylene oxide) polyol.

In Comparative Experiment 2 poly(axylene oxide) polyol E is used with a high Mn and an unsaturations content higher than 35 meq per kg of the poly(alkylene oxide) polyol.

Comparative Experiments 3-5 use polyol F, which has a high Mn and low unsaturation content but an ethylene oxide content smaller than 22 wt %.

In Comparative Experiment 6 poly(alkylene oxide) polyol G is used, which has a Mn larger than 2800 g/mol. The unsaturations content is much higher than 35 meq per kg of the poly(alkylene oxide) polyol, and the EO-content is below 20 weight %.

Contrary to poly(alkylene oxide) polyols E, F and G, the poly(alkylene oxide) polyols A, B and C gave a clear melt during polymerisation. F and G differ from A-C, amongst others in the content of polyethylene blocks, which for both F and G is 20%, thus lower than of the others. G has a high unsaturation content whereas F has a low unsaturation content. E on the other hand differs from A-C by the fact that it has a much higher unsaturation, much more than 35 meq/kg. The fact that D gives a clear product with a reasonable viscosity is surprising in the light of information from the cited prior art, but might be well attributed to the combination of facts that D has a limited molecular weight, D has an polyethylene content which is higher than in the examples of the cited prior art and D has an unsaturation which is borderline in respect of the present invention. It furthermore has been observed that if Comparative Experiment 1, based on D, is repeated on larger scale, a 2-step process involving a post condensation step is necessary to obtain a good product.

TABLE 2

Polycondensation time, appearance of the melt, torque at the end of pc, relative viscosity, amount of end groups (given in meq per kg of block copolyetherester elastomer) and overall molecular weights (calculated from the end groups) for block copolyetherester elastomers based on different poly(alkylene oxide) polyols.

| Example or Comp. Exp./ wt % of poly(alkylene oxide) polyol | PC-time [min] | melt | Torq. [Nm] | $\eta_{rel}$ | COOH [meq/kg] | OH [meq/kg] | Unsat. [meq/kg] | Mn [meq/kg] |
|---|---|---|---|---|---|---|---|---|
| Example I A/65 | 174 | Clear | 2.0 | 3.32 | 17 | 18 | 6.5 | 48200 |
| Example II A/70 | 371 | Clear | 1.9 | 3.40 | 18 | 13 | 7 | 52600 |
| Example III B/60 | 113 | Clear | 2.0 | 3.10 | 13 | 31 | 5.4 | 40500 |
| Example IV B/70 | 183 | Clear | 2.0 | 3.54 | 14 | 24.6 | 6.3 | 44500 |
| Example V B/75 | 217 | Clear | 2.0 | 3.78 | 14 | 21.5 | 6.8 | 47300 |
| Example VI B/50 | 90 | Clear | 2.0 | 2.73 | 12 | 44 | 4.5 | 33100 |
| Example VII C/65 | 253 | Clear | 1.6 | 3.15 | 17 | 16.2 | 17.6 | 39400 |
| Example VIII C/70 | 198 | Clear | 1.0 | 2.62 | 16 | 24.9 | 18.9 | 33400 |
| Comp. Ex. 1 D/55 | 185 | Clear | 2.2 | 2.75 | 16 | 26 | 20 | 32300 |
| Comp. Ex. 2 E/80 | 440 | Milky | 0.6 | 2.82 | 8 | 37 | 46 | 22000 |
| Comp. Ex. 3 F/70 | | Milky | 1.6 | 3.3 | 10 | 21 | 7 | 52600 |
| Comp. Ex. 4 F/75 | 263 | Milky | 1.4 | | | | | |
| Comp. Ex. 5 F/80 | 315 | Milky | 1.2 | 3.3 | 8 | 25 | 8 | 48800 |
| Comp. Ex. 6 G/80 | 375 | Turbid | 0.6 | Not measured | Not measured | Not measured | 83 | Not available |

Thermal Properties of the Block Polyetherester Elastomers
Thermal properties are given in Table 3.

TABLE 3

Melting temperature, enthalpy of melting and crystallinity PBT, overall crystallinity of the block copolyetherester elastomer, glass transition temperature and crystallization temperature of PBT, for block copolyetherester elastomers with different poly(alkylene oxide) polyols.

| Example or Comp. Exp./ wt % poly(alkylene oxide) polyol | $T_m$ PBT [° C.] | dH PBT [° C.] | Cry. PBT [%] | Cry. PBT [%] | $T_g$ [° C.] | $T_C$ PBT [° C.] |
|---|---|---|---|---|---|---|
| Example I A/65 | 193 | 11.9 | 24 | 8 | −64 | 128 |
| Example II A/70 | 181 | 8.3 | 19 | 6 | −64 | 111 |
| Example III B/60 | 203 | 28.4 | 49 | 20 | −64 | 144 |
| Example IV B/70 | 188 | 10.1 | 23 | 7 | −64 | 122 |
| Example V B/75 | 175 | 7.2 | 20 | 5 | −65 | 98 |
| Example VI B/50 | 212 | 27.1 | 38 | 19 | −63 | 158 |
| Example VII C/65 | 193 | 24.7 | 49 | 17 | −65 | 136 |
| Example VIII C/70 | 183 | 13.4 | 31 | 9 | −64 | 128 |
| Comp. Ex. 1 D/55 | 201 | 37.5 | 58 | 26 | −63 | 140 |
| Comp. Ex. 2 E/80 | 178 | 9.5 | 33 | 7 | −64 | 141 |
| Comp. Ex. 5 F/80 | 171 | 13.4 | 46 | 9 | −65 | 101 |
| Comp. Ex. 5 G/80 | Not measured | | | | | |

** assuming a melting enthalphy of 100% crystalline PBT of 144.5 J/g. [7]

The PBT crystallization for all materials is clearly determined by the average length of the PBT blocks. With increasing amount of soft block and decreasing length of soft block the melting temperature decreases. Along with the melting temperature also the PBT crystallinity and the crystallization temperature decrease reflecting the difficulties of the crystallization process of short, diluted PBT segments.

The copolymers of Comparative Experiments 2 and 3 show both a very low melting temperature whereas the crystallization temperatures are at the high end for Comparative Experiment 2 (based on polyol E) and at the low end for Comparative Experiment 3 (based on polyol F). The other values fall within the range. Nevertheless, the mechanical properties of these copolymers are very bad (see further below), indicating that polyol E and F are not very suited for the preparation of block copolyetherester copolymers.

The copolymer of Comparative Experiment 1 (based on polyol D, with Mn 2300) shows a high melting temperature and a high crystallization temperature, as well as a very high crystallinity (high values for dH, Cry and Overall. Cry at RT). This in contrast with for example the copolymers of Examples III and VI, (which have about the same amount of hard segments but are based on polyol B, with Mn 3300), which also have a high melting temperature and a high crystallization temperature, or even higher than C. E. C, but which have a much lower crystallinity (lower values for dH, Cry and Overall. Cry at RT).

For some application like e.g. fiber spinning a high crystallization temperature is crucial. Therefore it was attempted to increase the crystallization temperature by addition of a nucleating agent. As an alternative an attempt was made to improve the material properties by an extra solid state post condensation step (SSP). The results have been summarized in Table 4.

From the results it is clear that SSP only has lead to a limited increase in the desired property of crystallization temperature. By contrast, addition of 0.1% microtalc (Imifabi HTTP Ultra 5C talk) during injection moulding (dryblend) to B/75 (block copolymer of Example V, comprising a long chain polyol and a low amount of hard segments) lead to an increase of the crystallization temperature form 100° C. to 140° C., which is the same crystallization temperature as that of D/55 (block copolymer of Comparative Experiment 1, comprising a short chain polyol and a high amount of hard segments).

TABLE 4

Melting temperature, enthalpy of melting and crystallinity of PBT, overall crystallinity, glass transition temperature and crystallization temperature of PBT for B/75 after 48 h of postcondensation at 170° C. and after addition of 0.1% talc (dryblend).

| Example/Comp. Ex./wt % poly(alkylene oxide) polyol | H | $T_m$ PBT [° C.] | dH PBT [° C.] | Cry. PBT [%] | Overall Cry. at RT [%] | $T_g$ [° C.] | $T_C$ PBT [° C.] |
|---|---|---|---|---|---|---|---|
| B/75 | 2nd | 175 | 7.2 | 20 | 5 | −65 | 98 |
| B/75 + 48 h SSP | 1st | 184 | 13 | 36 | 9 | | |
| | 2nd | 182 | 6.4 | 16 | 4 | −63 | 113 |
| B/75 + talc | 2nd | 173 | 8.1 | 24 | 6 | −63 | 139 |

Mechanical Properties of the Block Polyetherester Elastomers

Table 5 shows an overview of the mechanical properties of the block copolyether ester polymers based on different polyol-type soft blocks for the various Examples and Comparative Experiments.

TABLE 5

Mechanical data of the block copolyether ester polymers based on different soft blocks, measured according to ShoreA (hardness) and ISO 527-2 (others).

| Example or Comp. Exp./ wt % poly-(alkylene oxide) polyol | Hardness [Shore A] | E' [Mpa] at 23° C. | Yield stress [MPa] | Tensile strength [MPa] | Strain at break [%] | Plastic strain at 100% elongation | Plastic strain at 500% elongation |
|---|---|---|---|---|---|---|---|
| Example II A/70 | 83 | 20 | 3.1 | 13.9 | 1360 | 14 | 153 |
| Example III B/60 | 91 | 45 | 5.0 | 21.1 | 930 | 17 | 182 |

TABLE 5-continued

Mechanical data of the block copolyether ester polymers based on different soft blocks, measured according to ShoreA (hardness) and ISO 527-2 (others).

| Example or Comp. Exp./ wt % poly-(alkylene oxide) polyol | Hardness [Shore A] | E' [Mpa] at 23° C. | Yield stress [MPa] | Tensile strength [MPa] | Strain at break [%] | Plastic strain at 100% elongation | Plastic strain at 500% elongation |
|---|---|---|---|---|---|---|---|
| Example IV B/70 | 84 | 20 | 3.1 | 16.2 | 1300 | 13 | 149 |
| Example V B/75 | 79 | 10 | 2.2 | 11.8 | 1470 | 12 | 133 |
| Example VI B/50 | 95 | 88 | 7.0 | 24.1 | 750 | 23 | 239 |
| Example VII C/65 | 87 | 26 | 4.0 | 17.8 | 1110 | 15 | 172 |
| Example VIII C/70 | 81 | 20 | 3.1 | 8.6 | 1120 | 15 | 162 |
| Comp. Ex. 1 D/55 | 93 | 55 | 6.8 | 23.7 | 890 | 22 | 253 |
| Comp. Ex. 2 E/80 | Not measured | 6 | Not measured | Not measured | 75 | 11 | — |
| Comp. Ex. 5 F/80 | Not measured | 5 | Not measured | Not measured | 250 | 9 | — |
| Comp. Ex. 6 G/80 | Not measured | | | | | | |

As can be seen all the Examples reveal good to very good mechanical properties. In particular Examples I, II, IV, V, VII and VIII show an elongation at break which as higher than any of the values reported for the materials mentioned in the cited prior art. while still having a very good tensile strength. These Examples are further characterised with a very low hardness and low E'-modulus and a very low plastic strain.

Examples III and particularly VI show a somewhat lower elongation at break and higher tensile strength, as well as a somewhat higher hardness, E'-modulus and plastic strain. These materials however show a good to very good water vapour permeability.

Moisture Vapor Transmission Rate

Tables 6 shows the results of the moisture vapour transmission rate (MVTR) tests according to ASTM E96B (wet cup) and E96BW (inverted cup). For comparison, the values of a commercial product (Sympatex: a polyether ester with 30 weight % PEG-4000 soft blocks).

The results show that the MVTR increases not only with increasing amount of soft block and increasing amount of PEO in the soft block, but in particularly so with the molecular weight of the soft block. All materials show a MVTR which is much better than that of Comparative Example 1. Furthermore, the materials of Example I and Example II show an MVTR comparable to that of Sympatex, while the materials of Examples IV and V show an even higher moisture vapor transmission rate compared to Sympatex.

TABLE 6

Results of the MVTR measurement according to ASTM E96B and E96BW (38° C., 50% rel. humidity)

| Example or Comp. Exp./ wt % poly(alkylene oxide) polyol | Wt % SB | Mn SB [g/mol] | Wt % PEO | Tickness [μm] | MVTR (E96B) [g · mm/ m² · day] | MVTR (E96BW) [g · mm/ m² · day] |
|---|---|---|---|---|---|---|
| Example I A/65 | 65 | 3000 | 45 | 77 | 118 | 632 |
| | | | | 84 | 117 | 652 |
| Example II A/70 | 70 | 3000 | 45 | 72 | 112 | 760 |
| | | | | 94 | 134 | 803 |
| Example III B/60 | 60 | 3300 | 50 | 80 | 115 | 913 |
| | | | | 77 | 115 | 901 |
| Example IV B/70 | 70 | 3300 | 50 | 83 | 131 | 1392 |
| | | | | 90 | 140 | 1344 |
| Example V B/75 | 75 | 3300 | 50 | 83 | 139 | 1447 |
| | | | | 78 | 133 | 1522 |
| Example VI B/50 | 50 | 3300 | 50 | 69 | 88 | 520 |
| | | | | 71 | 93 | 485 |
| Example VII C/65 | 65 | 2800 | 40 | 88 | 106 | 397 |
| | | | | 84 | 110 | 391 |
| Example VIII C/70 | 70 | 2800 | 40 | 60 | 95 | 457 |
| | | | | 74 | 109 | 489 |
| Comp. Ex. 1 D/55 | 55 | 2300 | 30 | 68 | 74 | 167 |
| | | | | 91 | 87 | 169 |
| Comp. Ex. 7 Sympatex | 30 | 4000 | 100 | 120 | 114 | 712 |

The invention claimed is:

1. Process for the preparation of a block copolyetherester elastomer comprising polyester blocks and poly(alkylene oxide) polyol blocks, wherein at least one aromatic dicarboxylic acid or an ester-forming derivative thereof, at least one alkylene diol, and a poly(alkylene oxide) polyol, comprising a poly(propylene oxide), end capped with ethylene oxide, are esterified, and wherein the poly(alkylene oxide) polyol has an ethylene oxide content of between 22 and 90% by weight, relative to the total weight of the poly(alkylene oxide) polyol, the poly(alkylene oxide) polyol has an unsaturation content, being the total content of vinyl and allyl groups, of less than 25 meq per kg poly(alkylene oxide) polyol, and the poly(alkylene oxide) polyol has an Mn of between 2500 and 5000 g/mol.

2. Process according to claim 1, wherein the poly(alkylene oxide) polyol has an ethylene oxide content between 30 and 70% by weight, relative to the total weight of the poly(alkylene oxide) polyol.

3. Process according to claim 1, wherein the poly(alkylene oxide) polyol has an unsaturation content, being the total content of vinyl and allyl groups, of less than 20 meq per kg poly(alkylene oxide) polyol.

4. Process according to claim 1,
wherein the poly(alkylene oxide) polyol has an ethylene oxide content of between 30 and 70% by weight.

5. Process according to claim 1, wherein:
the poly(alkylene oxide) polyol and the aromatic dicarboxylic acid or an ester forming derivative thereof are present in amounts to achieve a ratio by weight of poly(alkylene oxide) polyol/aromatic dicarboxylic acid or an ester-forming derivative thereof between 60/40 and 90/10; and wherein
the average degree of polymerization of the polyester block is at least 3.5; and wherein
the block copolyetherester elastomer has an Mn of at least 25,000 g/mol.

6. Block copolyetherester elastomer comprising polyester blocks and poly(alkylene oxide) polyol blocks, obtained by esterification of at least one aromatic dicarboxylic acid or an ester-forming derivative thereof, at least one alkylene diol, and a poly(alkylene oxide) polyol, comprising a poly(propylene oxide) end capped with ethylene oxide, wherein
a) the poly(alkylene oxide) polyol has an ethylene oxide content of between 22 and 90% by weight;
b) the block copolyetherester elastomer has an unsaturation content, being the total content of vinyl and allyl groups, of less than 25 meq per kg of the poly(alkylene oxide) polyol;
c) the poly(alkylene oxide) polyol has a Mn of between 2500 and 5000 g/mol;
d) in the block copolyetherester elastomer the ratio by weight of poly(alkylene oxide) polyol/aromatic dicarboxylic acid or the ester-forming derivative thereof is between 50/50 and 90/10;
e) the average degree of polymerization of the polyester block is at least 3.5; and
f) the block copolyetherester elastomer has an Mn of at least 25,000 g/mol.

7. A block copolyetherester elastomer according to claim 6, wherein the alkylene diol is 1,4-butane diol.

8. A block copolyetherester elastomer according to claim 6 wherein the polyester blocks comprise butylene terephthalate.

9. A block copolyetherester elastomer according to claim 6, wherein the poly(alkylene oxide) polyol has an Mn of between 3000 and 5000.

10. A block copolyetherester elastomer according to claim 6 having a vinyl content of less than 15 meq per kg of the poly(alkylene oxide) polyol.

11. A block copolyetherester elastomer according to claim 6 having an Mn of at least 35,000 g/mol.

12. Composition comprising a block copolyetherester elastomer according to claim 6 and at least one additive.

13. An elastic fiber or file which comprises a block copolyetherester elastomer according to claim 6.

14. Product comprising at least one block copolyetherester elastomer according to claim 7, the product preferably being an elastic fiber or film.

15. Process according to claim 1, wherein the ratio by weight of the poly(alkylene oxide) polyol to the at least one aromatic dicarboxylic acid or an ester-forming derivative thereof is between 50/50 and 90/10.

16. A block copolyetherester elastomer according to claim 6, wherein the ratio by weight of the poly(alkylene oxide) polyol to the at least one aromatic dicarboxylic acid or an ester-forming derivative thereof is between 50/50 and 90/10.

17. Process according to claim 1, wherein the poly(alkylene oxide) copolymer has an ethylene oxide content of between 40 and 60 wt. %.

18. Process according to claim 1, wherein the poly(alkylene oxide) copolymer has an ethylene oxide content of between 45 and 55 wt. %.

19. A block copolyetherester elastomer according to claim 6, wherein the poly(alkylene oxide) copolymer has an ethylene oxide content of between 30 and 70 wt. %.

20. A block copolyetherester elastomer according to claim 6, wherein the poly(alkylene oxide) copolymer has an ethylene oxide content of between 40 and 60 wt. %.

21. Process according to claim 1, wherein the poly(alkylene oxide) polyol has an unsaturation content, being the total content of vinyl and allyl groups, of less than 15 meq per kg poly(alkylene oxide) polyol.

22. A block copolyetherester elastomer according to claim 6, having a vinyl content of less than 20 meq per kg of the poly(alkylene oxide) polyol.

* * * * *